US009189892B2

(12) United States Patent
Palm et al.

(10) Patent No.: US 9,189,892 B2
(45) Date of Patent: Nov. 17, 2015

(54) SYSTEMS AND METHODS FOR ACTIVITIES SOLVER DEVELOPMENT IN AUGMENTED REALITY APPLICATIONS

(75) Inventors: Leon Palm, Santa Monica, CA (US); Hartwig Adam, Marina del Ray, CA (US)

(73) Assignee: Google Inc., Mountain View, CA (US)

( * ) Notice: Subject to any disclaimer, the term of this patent is extended or adjusted under 35 U.S.C. 154(b) by 996 days.

(21) Appl. No.: 13/175,252

(22) Filed: Jul. 1, 2011

(65) Prior Publication Data
US 2015/0170417 A1 Jun. 18, 2015

(51) Int. Cl.
*G06T 19/00* (2011.01)
*G09G 5/00* (2006.01)
*G06F 3/01* (2006.01)

(52) U.S. Cl.
CPC .............. *G06T 19/006* (2013.01); *G06F 3/011* (2013.01); *G06T 19/00* (2013.01)

(58) Field of Classification Search
CPC .... G06T 19/006; G06T 7/0083; G03B 29/00; G06F 3/01; G06F 3/017; G06F 3/04883; G06K 9/00355; G06K 9/00375; G06K 9/3216; G06K 9/6202; G06K 9/78; G06K 9/00268
See application file for complete search history.

(56) References Cited

U.S. PATENT DOCUMENTS

2005/0288078 A1 12/2005 Cheok
2007/0201863 A1* 8/2007 Wilson et al. ................. 396/429
2008/0222065 A1* 9/2008 Kedrowski et al. ............. 706/19

OTHER PUBLICATIONS

Andrew D. Wilson, "PlayAnywhere: A compact Interactive Tabletop Projection-vision system", Proceeding UIST '05 Proceedings of the 18th Annuanl ACM symposium on User interface software and technology, pp. 83-92, ACM New York, NY, USA © 2005.*
Cooper et al., "Augmented Reality Chinese Checkers", School of Computer and Information Science University of South Australia, 2004.
Byrod, "An Optical Sudoku Solver", http://www.maths.lth.se/matematiklth/personal/byrod/papers/sudok.uocr.pdf., Feb. 12, 2007.
Cakmakci, "An Augmented Reality Based Learning Assistant for Electric Bass Guitar", In Proc. of the 10th International Conference on Human-Computer Interaction, 2003.
Universitat Politecnica de Catalunya, "Two Students from the Terrassa School of Engineering Design an Innovative Augmented Reality System for Learning to Play Chess", http://www.alphagalileo.org/ViewItem.aspx?ItemID=96464&/ CultureCode=en, Feb. 18, 2011.

* cited by examiner

*Primary Examiner* — Tize Ma
(74) *Attorney, Agent, or Firm* — Fish & Richardson P.C.

(57) ABSTRACT

Systems and methods for generating an augmented reality interface for generics activities are disclosed. The systems and methods may be directed to creating an augmented reality display for an activity performed on a surface. Given an image of the activity, an activity solver library and associated configuration information for the activity may be selected. The surface of the activity from the image may be rectified, forming a rectified image, from which activity state information may be extracted using the configuration information. The activity state information may be provided to the activity solver library to generate solution information, and elements indicating the solution information may be rendered in a perspective of the original image. By providing the configuration information associated with an activity solver library, an augmented reality interface can be generated for an activity by capturing an image of the activity.

20 Claims, 9 Drawing Sheets

SYSTEMS AND METHODS FOR ACTIVITIES SOLVER DEVELOPMENT IN AUGMENTED REALITY APPLICATIONS

FIELD

This disclosure relates to uses of machine vision and activities solvers, and in examples, to augmented reality (AR) activities.

BACKGROUND

Machine vision enables systems and computers to analyze images and extract information useful for controlling an activity. Exemplary systems may be able to recognize objects in an image in order to understand what the objects mean using pre-determined image processing techniques. Machine vision systems may also enhance images with rendered elements using, for example, augmented reality.

AR may refer to a live direct or indirect view of a physical environment whose elements are augmented by computer-generated sensory input. Examples of AR include graphics superimposed on television broadcasts of sporting events, heads-up displays integrated into car windshields, and helmet mounted displays worn by pilots.

SUMMARY

This disclosure may disclose, inter alia, systems and methods for generating an augmented reality interface for generic activities. Given an image of an activity performed on a surface and configuration information associated with the activity, an augmented reality display for the activity may be created. An activity solver library for the activity can be selected, and rectification of the surface of the activity, determination of activity state information, and rendering of elements indicating solution information on the image may be performed utilizing the configuration information.

In one example, a method for generating an augmented reality display for a generic activity is provided. In the method, an image of an activity performed on a surface is received. The method includes, but is not limited to, selecting an activity solver library from a plurality of activity solvers and configuration information associated with the activity. The activity solver library is configured to provide solution information for the activity given activity state information. The method also includes determining a rectified image of the surface of the activity based on the configuration information. The rectified image may be a top-down perspective of the activity performed on the surface. The rectified image may also map each point or a number of points of the surface within the received image to an expected position within the rectified image based on the configuration information. The method further includes processing a fixed set of locations in the rectified image based on the configuration information to determine the activity state information. The method also includes providing the activity state information to the activity solver library and obtaining solution information from the activity solver library. Based on the solution information, an augmented reality display for the activity may be generated. The augmented reality display may include rendered elements on the received image in a perspective of the received image.

In another example, a computer-readable medium with instructions stored thereon is provided. The instructions contain instructions executable by a computing device. The instructions may be executable for generating an augmented reality display for a generic activity. The instructions may be further executable for receiving an image of an activity performed on a surface. The instructions also may be executable for selecting an activity solver library from a plurality of activity solvers and configuration information associated with the activity. The activity solver library is configured to provide solution information for the activity given activity state information. The instructions may be further executable for determining a rectified image of the surface of the activity based on the configuration information. The rectified image may be a top-down perspective of the activity performed on the surface. The rectified image may also map each point or a number of points of the surface within the received image to an expected position within the rectified image based on the configuration information. The instructions also may be executable for processing a fixed set of locations in the rectified image based on the configuration information to determine the activity state information. The instructions may be further executable for providing the activity state information to the activity solver library and obtaining solution information from the activity solver library. Based on the solution information, an augmented reality display for the activity may be generated. The augmented reality display may include rendered elements on the received image in a perspective of the received image.

In another example a system is provided. The system comprises a memory and a processor coupled to the memory. The system further includes instructions, executable by the processor, stored in the memory. The instructions may be executable by the processor for generating an augmented reality display for a generic activity. The instructions may be further executable for receiving an image of an activity performed on a surface. The instructions also may be executable for selecting an activity solver library from a plurality of activity solvers and configuration information associated with the activity. The activity solver library is configured to provide solution information for the activity given activity state information. The instructions may be further executable for determining a rectified image of the surface of the activity based on the configuration information. The rectified image may be a top-down perspective of the activity performed on the surface. The rectified image may also map each point or a number of points of the surface within the received image to an expected position within the rectified image based on the configuration information. The instructions also may be executable for processing a fixed set of locations in the rectified image based on the configuration information to determine the activity state information. The instructions may be further executable for providing the activity state information to the activity solver library and obtaining solution information from the activity solver library. Based on the solution information, an augmented reality display for the activity may be generated. The augmented reality display may include rendered elements on the received image in a perspective of the received image.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
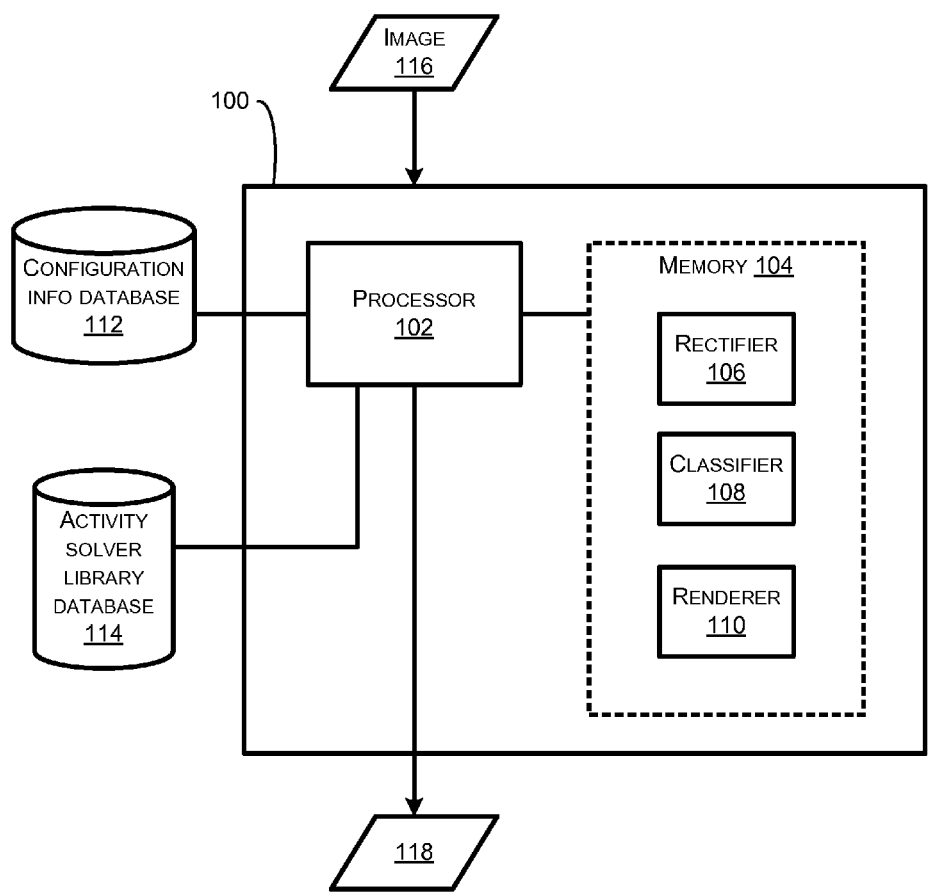
FIG. 1A illustrates an example system.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, systems and methods for generating an augmented reality interface for generic activities. An image of an activity performed on a surface may be received. An activity solver library corresponding to the activity and configuration information associated with the activity may be selected. The activity solver library may be selected from among a plurality of activity solvers and can be configured to provide solution information for the activity given activity state information.

In one example, based on the received image of the surface of the activity and the configuration information, a rectified image of the surface is determined. The rectified image may be a top-down perspective of the activity performed on the surface. Additionally, each point of the surface within the received image may be mapped to an expected position within the rectified image. The configuration information may be utilized to process a fixed set of locations within the rectified image to determine activity state information. The activity state information may be provided to the activity solver library to obtain solution information from the activity solver library. Further, based on the solution information, rendered elements in a perspective of the received image may be rendered on the received image, generating an augmented reality display for the activity.

In another example, the configuration information associated with the activity may describe the surface of the activity.

For example, the configuration information may describe the surface of the activity as a rectangular grid including a number or rows and columns. The configuration information may also describe a relationship of relative features on the surface. The rectified image may be determined based on the configuration information. For example, four corners of the surface of the activity within the received image may be mapped to four corners of the rectified image. In one example, a homography matrix may be determined mapping points within the received image to points within the rectified image. Moreover, an inverse of the homography matrix may be used to render solution information from the rectified image in the perspective of the received image on the received image.

In another example, the configuration information associated with the activity may include information identifying the fixed set of locations within the rectified image to be processed, as well as information used to classify activity state information for the fixed set of locations.

In an additional example, activity state information may be provided to the selected activity solver library as a first array of integers indicating information about the fixed set of locations. Positions within the first array of integers may correspond to activity state information for locations within the processed fixed set of locations of the rectified image. Also, the activity solver library may provide solution information as a second array of integers. In some examples, differences between the first array of integers and second array of integers may be provided as rendered elements in the rectified image.

Referring now to the figures, FIG. 1A illustrates an example system 100. The system 100 includes a processor 102, a memory 104 storing a rectifier 106, a classifier 108, and a renderer 110. Additionally, the system 100 may include or access a configuration information database 112 and activity solver library database 114.

The processor 102 may be any type of processor, such as a microprocessor, digital signal processor (DSP), multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

The rectifier 106, classifier 108, and renderer 110 may be computer modules. The modules may be a segment, or portion of program code, which includes one or more instructions executable by the processor 102 for implementing specific logical functions or steps.

Figure 1B:
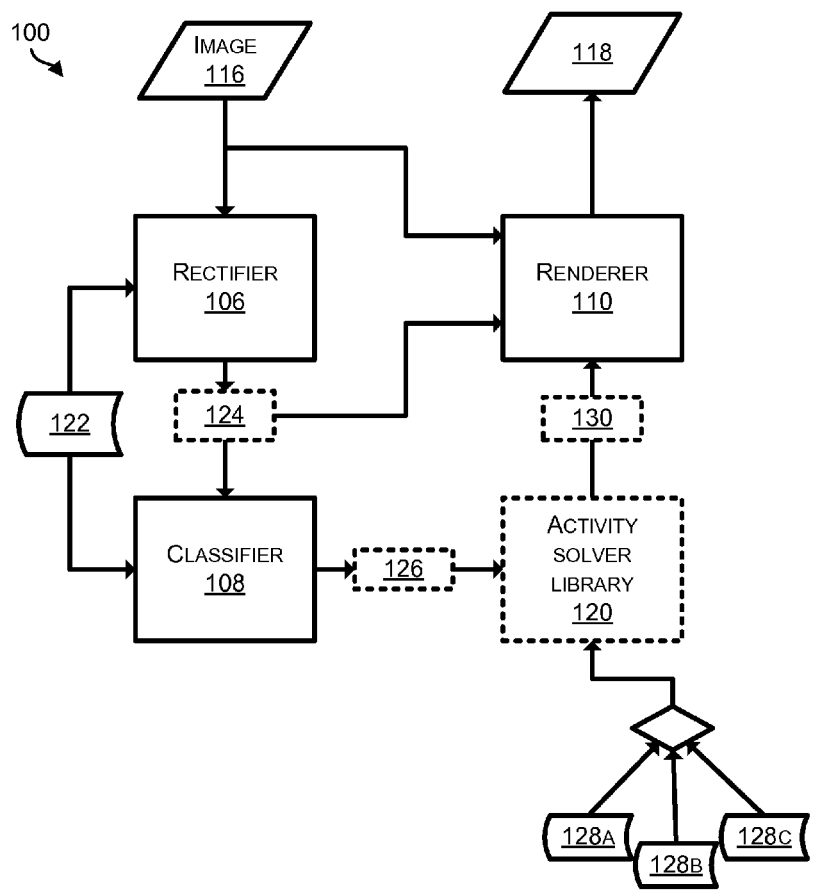
FIG. 1B illustrates an example flow diagram of the system.

In one example, the system 100 may receive as input a received image 116, and generate an augmented reality display 118, as described in FIG. 1B, for example.

FIG. 1B illustrates an example flow diagram of the system 100. The system 100 may receive as input the received image 116 of an activity configured to be performed on a surface. The augmented reality display 118 for the activity may be output by the system 100. The system 100 may also select an activity solver library 120 and configuration information 122 to generate the augmented reality display 118 for the activity.

In one example, the rectifier 106 may be configured to locate the surface of the activity in the image 116 using the configuration information 106. The rectifier 106 may output a rectified image 124 of the surface such that each point on the surface is mapped to a position on the rectified image 124, or such that a number of points (one or more, a substantial number, corner points, etc.) are mapped to a position on the rectified image 124. For example, the activity may be a game of Checkers, and the rectifier 106 may identify a rectangular grid in the image 116 as a checkerboard. The rectifier 106 may rectify the image 116 such that four corners of the checkerboard correspond to four corners of the rectified image 124. In some examples, the activity may be played on multiple surfaces and the rectifier 106 may output one or more rectified images of the surfaces.

In one example, the classifier 108 may be configured to receive the rectified image 124 and to extract activity state information 126. This may be accomplished by examining a fixed set of locations in the rectified image 124. The configuration information 122 may provide information identifying the fixed set of locations within the rectified image 124. Additionally, the configuration information 122 may provide information identifying how to determine activity state information 126 at the fixed set of locations within the rectified image 124. In one example, the activity state information 126 may be an array of integers. A position in the array of integers may indicate activity state information 126 for a location within the fixed set of locations. Similarly, the activity state information 126 may take the form of any logical data structure for maintaining information regarding the state of the activity.

The activity state information 126 may be provided to the activity solver library 120 in one example. The activity solver library 120 may be selected from among a plurality of activity solver libraries 128a, 128b, and 128c. The plurality of activity solver libraries 128a, 128b, and 128c may be associated with a variety of different activities. Additionally, the plurality of activity solver libraries 128a, 128b, and 128c may be existing, open-source, implementations of libraries that can perform, solve, or provide advice associated with the activities. The configuration information 122 may provide information to convert the activity state information 126 to a native representation of the activity solver library 120. For example, the configuration information 122 may include a function used to convert activity state information 126 in the form of an array of integers to a data structure usable by the activity solver library 120.

In another example, the activity solver library 120 may output solution information 130. The solution information 130 may be one or any combination of updated activity state information, a next move associated with the activity or multiple next moves, advice regarding the activity state information 126, among other possibilities. In one example, the configuration information 122 may provide information used to convert information output by the activity solver library 120 to the solution information 130. In some examples, the solution information 130 may be in the same form as the activity state information 126. For example, one or more of the activity state information 126 and solution information 130 may be an array of integers.

In one example, the solution information 130 may be provided to the renderer 110. The renderer 110 may output the solution information 130 as rendered elements on the rectified image 124. The rendered elements on the rectified image 124 may be viewable on a conventional display (e.g., liquid crystal display (LCD), light-emitting diode (LED) display, etc.) of a computing device or user interface device. Additionally, the renderer 110 may enhance the received image 116 with the rendered elements in the perspective of the image 116, producing an augmented reality interface. In some examples, the rendered elements may overlay the image 116 or overlay a live video stream of the activity.

In one embodiment, the system 100 may be a toolkit for generating an augmented reality display 118 for a generic activity performed on a surface. The toolkit may include the rectifier 106, classifier 108, renderer 110, and a wrapping function used to call the game solving library 120 for the activity. By selecting the game solving library 120 and configuration information 122 for the activity, an augmented reality display 118 may be generated using the toolkit without requiring knowledge of machine vision or image processing techniques. The configuration information 122 may provide information used to identify the surface of the activity from the image 116 and generate the rectified image 124. Similarly, the configuration information 122 may provide information to infer the activity state information 126 from a top-down view of the surface. The toolkit described may aim to support no activity in particular, but allow potentially any activity performed on a surface to be supported.

Figure 2:
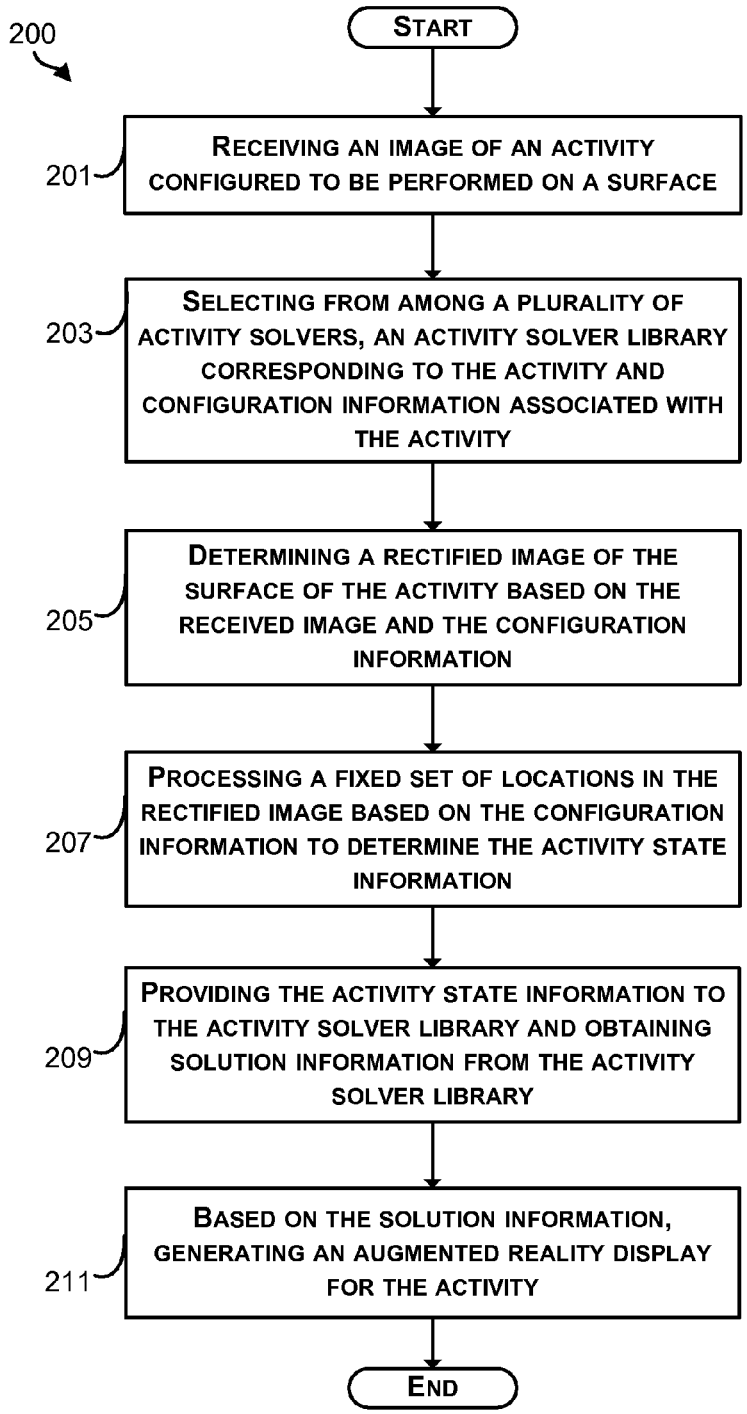
FIG. 2 is an example block diagram of a method to generate an augmented reality display for a generic activity, in accordance with at least some embodiments described herein.

FIG. 2 is an example block diagram of a method 200 to generate an augmented reality display for a generic activity, in accordance with at least some embodiments described herein. The method 200 shown in FIG. 2 presents an embodiment of a method that may, for example, be used by the system 100 of FIG. 1. Method 200 may include one or more operations, functions, or actions as illustrated by one or more of blocks 201-211. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 201, the method 200 includes receiving an image of an activity configured to be performed on a surface. In one example, the image 102 may be received from a user interface. The image 102 may be captured, for example, through any type of imaging device. The image 102 may be received from a built-in camera of a mobile device. Alternatively, the image 102 may be captured as frames of a video stream or screenshots of a virtual game. In another example, the image 102 may be captured using a computing device with a camera. The camera may a video camera, or webcam, for example. Additionally, the image may be captured by a robot, a toy, a gaming counsel with a camera, among other possible computing devices with a camera.

The image may be received at a server, a user-client device, or a general computing device. In one example, the image may be captured by a client device and sent to a server for processing.

At block 203, the method 200 includes selecting from among a plurality of activity solvers, an activity solver library corresponding to the activity and configuration information associated with the activity. The activity solver library may be configured to provide solution information for the activity given activity state information. The activity solver library may be selected based on the current activity captured in the image. Also, the configuration information may be provided as information for generating an augmented reality display for the activity of the image. In one example, contingent on the availability of activity solver libraries associated with activities, the method 200 may be applicable to any generic activity performed on a surface. An activity solver library and associated configuration information may be provided in a database for association with any activity solver library. The activity solver library and configuration information associated with an activity may be selected from the database, using a processor of a computing device.

At the block 205, the method 200 includes determining a rectified image of the surface of the activity based on the received image and the configuration information. The method 200 may be flexible to determine a rectified image of the surface of a wide range of activities. The rectified image may be a top-down perspective of the activity performed on the surface. Additionally, each point of the surface within the received image may map to an expected position within the rectified image. Alternatively, some points, a substantial number of points, or landmark points (e.g., corners, center, etc.) of the surface within the rectified image may map to positions in the rectified image.

In one example, a rectified image of the surface of the activity is determined using quadrilateral rectification. Perspective-deformed elements in the received image may be located to produce an expected top-down perspective of the elements. Edges of a potential element forming a polygon may be recognized in the received image. For example, edges of a quadrilateral forming a convex polygon may be identified. The quadrilateral may be rectified, or righted and straightened to align with the rectified image, such that each edge of the quadrilateral is parallel to an edge of the rectified image. In one embodiment, the configuration information may indicate the surface of an activity is a rectangular surface. A rectified image of the rectangular surface may then be output.

In another example, a rectified image of the surface of the activity is determined using feature-based matching. The configuration information may include a set of training images of the surface of the activity. The method 200 may include detecting a relative arrangement of features within the received image to construct a mapping between the received image and the rectified image. A robust object detector or algorithm (e.g., scale-invariant feature transform (SIFT), an image recognition engine, speeded up robust features (SURF), etc.) may be trained on the set of training images of the surface. If the surface is detected in the received image, the relative arrangement of the features of the surface can be used to construct a mapping from the received image to the rectified image.

At block 207, the method 200 includes processing a fixed set of locations in the rectified image based on the configuration information to determine the activity state information. In one example, the fixed set of locations is determined based on the configuration information associated with the activity.

Various techniques may be used for examining and classifying information of the rectified image to determine the activity state information. The configuration information may indicate the method or technique to be used to determine the activity state information and include any parameters necessary for the method or technique.

In one example, color matching may be used to determine the activity state information. Processing the fixed set of locations may include determining regions of colors within the fixed set of locations. The configuration information may include information identifying colors that may occur within the fixed set of locations and information used to convert the determined regions of color to activity state information for the fixed set of locations. The configuration information may specify which colors to look for, or at least how many different colors may occur. For example, in an activity performed with black and white pieces on a brown surface, the configuration information may include the three colors of black, white, and brown and their associated representations. Processing the fixed set of locations may include determining if a location is black, white, or brown. This information may then be translated to an integer, or other data structure, as a portion of the activity state information. A black color found within the location may indicate the presence of a black piece, and an integer, (1), for example, may be determined representing the black piece. An average pixel value within the location may be determined and compared with the possible colors to determine the closest match, and most likely classification of the location.

In another example, optical character recognition (OCR) may be used to determine the activity state information. Processing the fixed set of locations may include determining characters within the fixed set of locations using OCR. The configuration information may comprise a list of characters to be recognized and information used to convert the determined characters to activity state information for the fixed set of locations. OCR may return the most likely characters within the fixed set of locations by comparing information within the rectified image to the list of characters. Additionally, a character within a location may configured to an integer value to be included within the activity state information. The configuration information may include information to convert the character to the integer. A lookup table may be used for example to convert the list of characters to integers.

In another example, feature matching may be used to determine the activity state information. Feature matching may be used, for example, in activities with pieces, tokens, or objects. A set of example images of pieces, tokens, or objects to be matched may be provided by the configuration information. Feature matching may then be used to determine the most likely pieces, tokens, or objects, if any, associated with the fixed set of locations of the rectified image. A robust object detector or algorithm (e.g., scale-invariant feature transform (SIFT), an image recognition engine, speeded up robust features (SURF), etc.) may be trained on the set of example images and used for the feature matching. Configuration information may provide information necessary to convert the matched pieces, tokens, or objects to activity state information.

In some examples, a combination of techniques or methods may be used to determine activity state information for an activity. One or more of the above methods, or additional methods may be employed to determine the activity state information by processing the rectified image.

In one example, the activity may be a game of Go. The activity may be performed on a 19-by-19 grid of lines forming 361 evenly spaced intersections. Players of Go may place black or white stones on intersections of the lines to perform the activity. The configuration information may provide information indicating to determine an average pixel color value at intersections of the grid lines. The average pixel color value may then be compared to a set of colors provided by the configuration information. Black stones, white stones, and blank spaces may be classified as respective values of 0, 1, or 2. The activity state information may be an array of 361 integers, where each of the 361 intersections of the grid lines may be represented by an integer within the array.

In another example, the activity may be a game of Sudoku. The configuration information may indicate the use of OCR to determine characters of a 9-by-9 table of 81 positions. The configuration information may indicate as a list of characters the digits 1 through 9. Processing the rectified image may produce an array of 81 integers corresponding to digits for each of the positions. Blank positions may be associated with the integer zero.

At block 209, the method 200 includes providing the activity state information to the activity solver library and obtaining solution information from the activity solver library. The activity solver library may perform, solve, or provide advice for the activity as solution information. The configuration information may include information to convert the activity state information as an array of integers to information in a form of input acceptable by the activity solver library.

The activity solver library may process the activity state information and provide or output an updated activity state as solution information. The solution information may, in some examples, be converted back to an array of integers as activity state information and provided to a renderer module. In one example, the solution information may include other information used to create activity-specific rendered elements. The configuration information may provide information to process the information output by the activity solver library into a form of solution information suitable for creating rendered elements on the rectified image of the activity.

In one example, a confidence level of the activity state information associated with an individual location within the fixed set of locations may be determined. Solution information obtained from the activity solver library may include information identifying an illegal activity state. A confidence level of the activity state information associated with the individual location may be used to correct the activity state information associated with the individual location. For example, the activity may be a game of Sudoku, and additional heuristics such as the validity of the activity state information can be used to enhance the accuracy of the activity state information. If the activity state information wrongly identified two 8's in the same row (an illegal state), the 8 with the least confidence could be changed to be a 3. In another example, the configuration information may include information identifying legal and illegal states such that illegal states could be identified prior to providing activity state information to the activity solver library.

At block 211, the method 200 includes based on the solution information, generating an augmented reality display for the activity. The augmented reality display may include rendered elements on the received image in a perspective of the received image. Rendered elements associated with the solution information may be created on the rectified image of the activity. In one example, activity state information is provided to the activity solver library as a first array of integers. The activity solver outputs solution information associated with the first array of integers. The solution information is converted to a second array of integers using the configuration information. A difference between the first array of integers and the second array of integers is determined, and the difference is provided as rendered elements in the rectified image.

In one example, the configuration information may include information describing how to render the solution information. Solution information may be in the form of activity state information, and activity state information may be rendered according to the method or technique used to classify the activity state information. For example, for color matching scenarios, the renderer may provide a blob of an appropriate color at a location in the rectified image. Similarly, for OCR scenarios, the rendered may print an appropriate character or group of characters at the location. For feature matching scenarios, an appropriate example training image may be drawn at the location.

In another example, the method 200 may further include determining a homography matrix mapping points within the received image to points within the rectified image. Any two images of a planar surface in space may be related by a homography, where the homography is a projective linear transformation. A homography matrix may include information describing camera motion, (i.e., rotation and/or translation) between camera positions used to create the two images. Given rendered elements in the rectified image, an inverse of the homography matrix may be used to render the rendered elements in the rectified image in the perspective of the received image. The rendered elements may be rendered in a correct perspective and appear to have been part of the original scene, or received image, creating an augmented reality.

Figure 3:
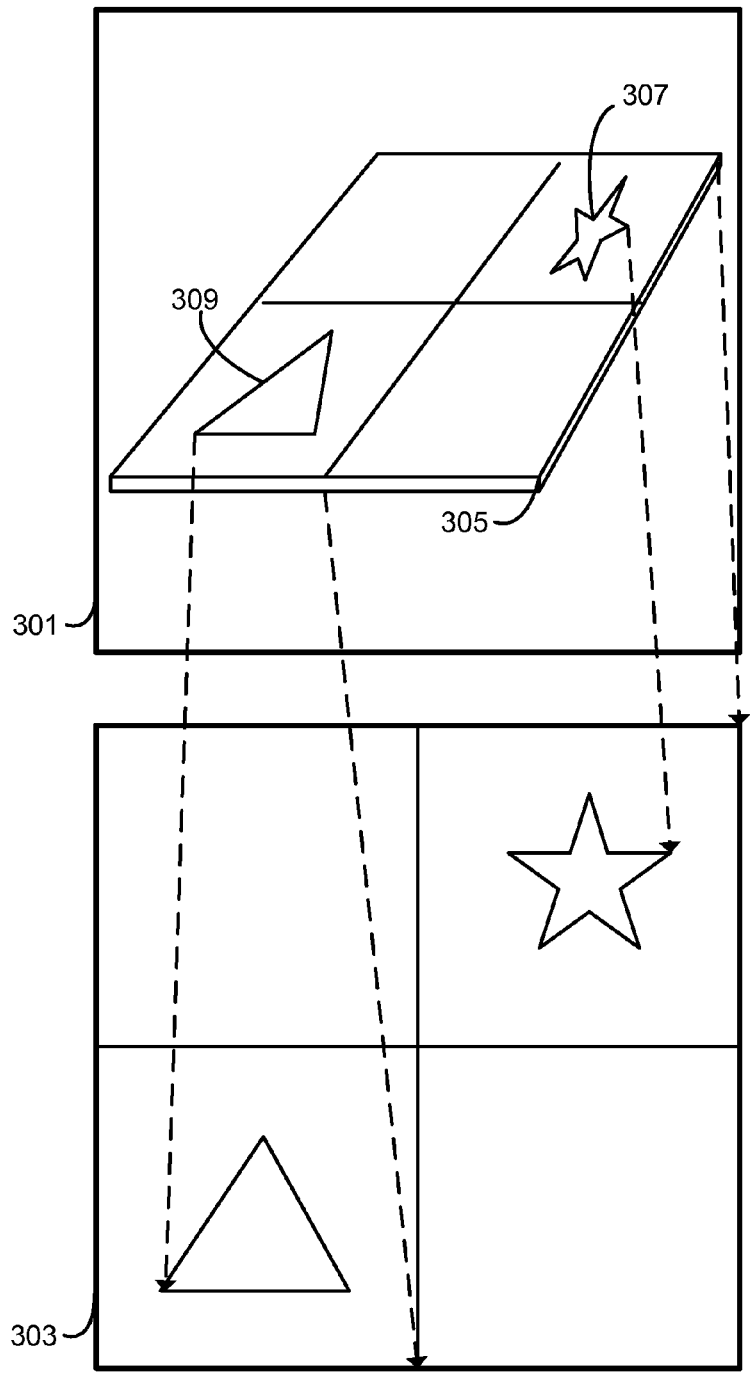
FIG. 3 illustrates an example of a received image and a rectified image.

FIG. 3 illustrates an example of a received image 301 and a rectified image 303. In one example, the rectified image 303 may be determined based on the received image 301 and associated configuration information. The configuration information may indicate an activity that is performed on a surface 305 including two intersecting perpendicular lines forming a 2-by-2 grid of four cells. The configuration information may also include information indicating the presence of a first feature 307 and a second feature 309 on the surface 305.

In one example, the rectified image 303 may be determined using a combination of quadrilateral rectification and feature matching. Quadrilateral rectification may be used to determine the surface 305 and feature matching may use a set of training images to identify the first feature 307 and second feature 309. An algorithm may be used to identify lines forming perspective-deformed cells within the received image 301. A relative arrangement of the first feature 307 and second feature 309 may also be used to determine a proper orientation of the surface 305 in the rectified image 303. For example, the configuration information may indicate the presence of the first feature 307 in the upper right hand corner and the second feature 309 in the lower left hand corner.

The rectified image 303 may map points on the surface 305 in the received image 301 to expected positions within the rectified 303. In FIG. 3, dotted lines represent the relationship between points on the surface 305 in the received image 301 and points in the rectified image 303. Additionally, in FIG. 3, four corners of the surface 305 in the received image 301 map to four corners of the rectified image 303. In some examples, a homography matrix associated with the relationship between the received image 301 and rectified image 303 may also be determined.

Figure 4A:
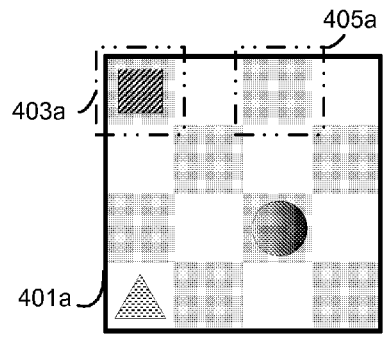
FIG. 4a illustrates an example of processing a rectified image to determine activity state information.

FIG. 4a illustrates an example of processing a rectified image 401a to determine activity state information. Configuration information may indicate the use of color matching to determine activity state information. The configuration information may also indicate a fixed set of locations to process.

For example, the rectified image 401a may be a square surface including 16 evenly spaced cells of a 4-by-4 grid. Processing a first location 403a may indicate an average pixel color value associated with a first color. Activity state information may include information indicating the presence of an activity piece with the first color in the first location 403a. Processing a second location 405a, an average pixel color value associated with a second color may be determined. The second color may be closest to a color defined in the configuration information that is associated with the surface. The second location 405a may be determined to be blank or empty, and the activity state information may indicate the empty space. According to the same manner, additional locations within the fixed set of locations may be processed to determine the activity state information for the activity.

Figure 4B:
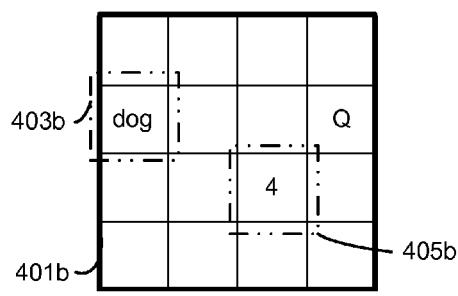
FIG. 4b illustrates another example of processing a rectified image to determine activity state information.

FIG. 4b illustrates another example of processing a rectified image 401b to determine activity state information. Configuration information may indicate the use of OCR to determine activity state information. The surface of an activity may include 16 evenly spaced cells of a 4-by-4 grid. Although the surface is illustrated as a grid of 16 evenly spaced cells, the surface may be any shape and potentially include no cells, or any number of cells. Cells within the rectified image 401b may possibly contain digits or letters. Processing a first location 403b, OCR may determine the letters "dog". Although the characters of location 403b are arranged left-to-right forming the word "dog", in some examples, characters within a location of a surface may be arranged in multiple rows and/or separated by any amount of blank space. Processing a second location 405b, OCR may determine the digit "4". Additionally, processing some locations may not determine any characters for a location, and a location may be determined to be blank. The configuration information may indicate how to convert the determined characters to activity state information for the rectified image 401b.

Figure 4C:
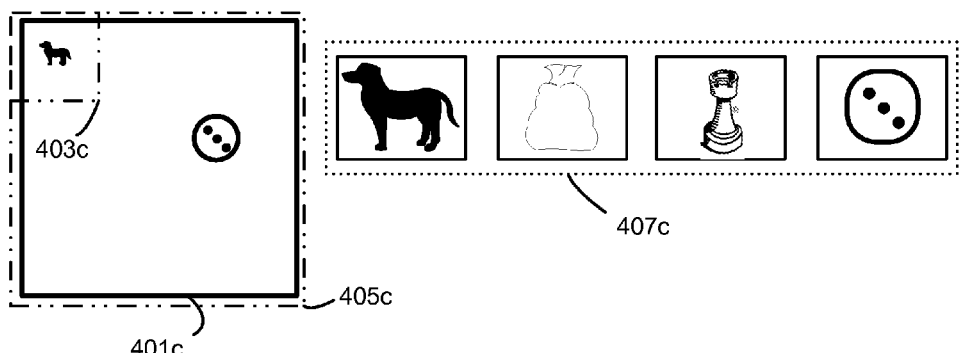
FIG. 4c illustrates another example of processing a rectified image to determine activity state information.

FIG. 4c illustrates another example of processing a rectified image 401c to determine activity state information. Configuration information may indicate the use of feature matching to determine activity state information. A first location 403c in the upper left hand corner of the rectified image 401c may be processed. Similarly, a second location 405c may be processed. Features within the first location 403c and second location 405c may be identified using a set of training images 407c of activity pieces, tokens, or objects. For example, processing the first location 403c may result in the identification of a first feature, an image of a dog, from the set of training images 407c. Also, processing the second location 405c may result in the identification of the same first feature, as well identification of a second feature, an image of a die with a face including 3 dots (i.e., a traditional cubic die with a resting attitude representing the number 3). The configuration information may indicate how to convert the identified features to activity state information for the rectified image 401c.

As illustrated in FIG. 4c, locations of the fixed set of locations may overlap. In other examples, locations of the fixed set of locations may each cover exclusive portions of the rectified image 401c, such that locations of the fixed set of locations do not overlap. In one example, every point within the rectified image 401c may be processed. Alternatively, in other examples, the points covered by the fixed set of locations collectively may not cover the entire rectified image 401c. In another example, as illustrated in FIG. 4c, the second location 405c may be the entire rectified image 401c.

In some examples, locations of the fixed set of locations may be processed in a logical manner, starting with an initial location in the upper left hand corner of a rectified image, proceeding left-to-right across the image, and top-to-bottom to process other locations. Alternatively, locations of the fixed set of locations may be processed in any random or logical fashion.

Figure 5:
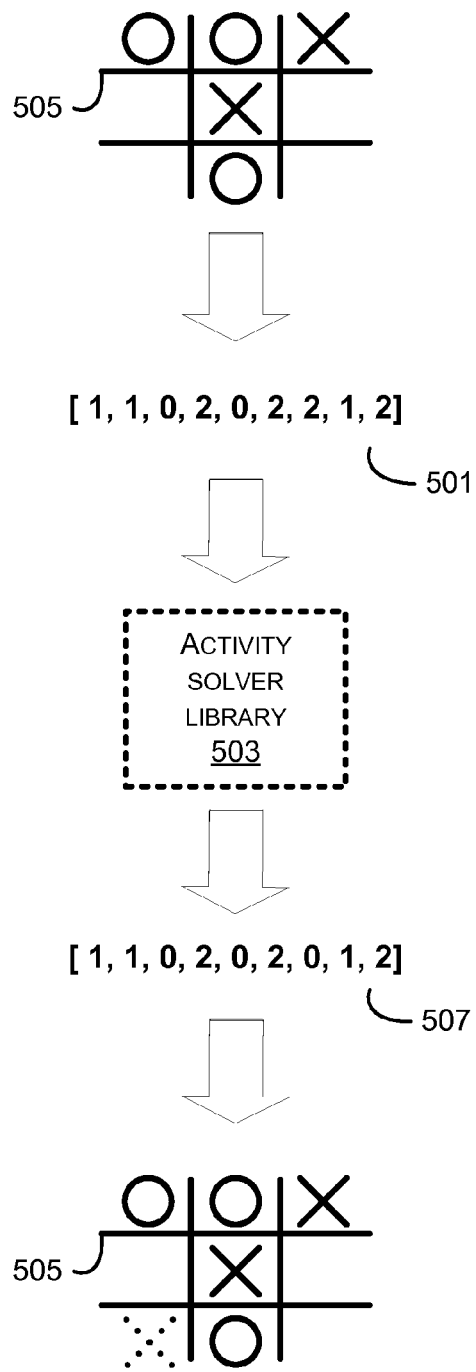
FIG. 5 illustrates an example of activity state information, updated by an activity solver library and displayed within a rectified image.

FIG. 5 illustrates an example of activity state information 501, updated by an activity solver library 503 and displayed within a rectified image 505. The activity solver library 503 may output solution information 507 in the same form as the activity state information 501. In one example, an activity may be a game of Tic-Tac-Toe. Activity state information 501 may be determined using feature matching or OCR. Three classes of information may exist for a 3-by-3 grid of evenly spaced positions within the rectified image 505. For example, crosses or "X's" may be associated with the integer zero, "O's" may be associated with the integer one, and empty or blank spaces may be associated with the integer two. Activity state information may be processed left-to-right, top-to-bottom to determine an array of nine integers representing activity state information.

In one example, activity state information 501 may be an array of nine integers classifying the rectified image 505. The activity state information may be provided to the activity solver library 503, and solution information 507 may be obtained. The solution information 507 may be updated activity state information illustrating a potential next action or solution for the game. A difference between the solution 507 information and activity state information 501 may be determined. In the example of FIG. 5, the seventh integer in the solution information 507, a zero, differs from the seventh integer of the activity state information 501, a two. As a result, the class of information associated with the integer zero may be provided in the rectified image 505 at the location associated with the seventh integer. The seventh integer is associated with the bottom left position. Therefore, a cross is rendered at the bottom left position of the rectified image 505.

Figure 6:
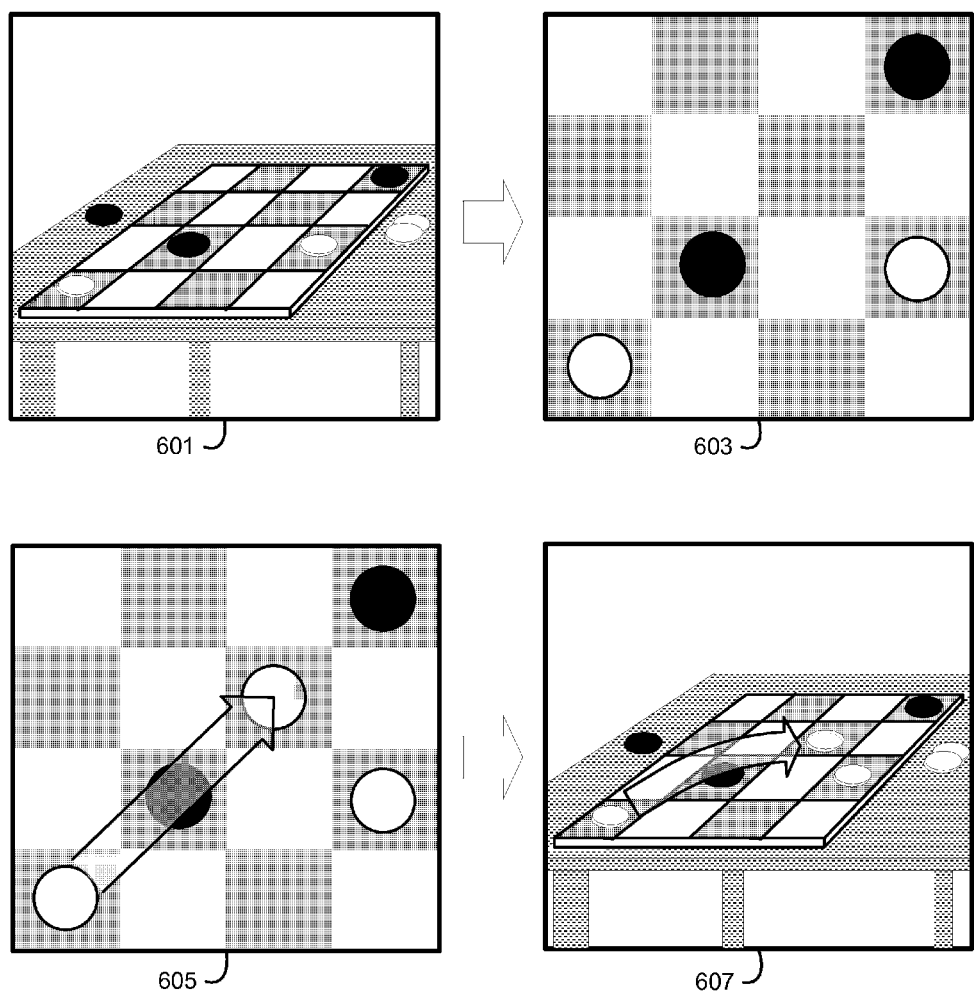
FIG. 6 illustrates an example augmented reality interface for an activity.

FIG. 6 illustrates an example augmented reality interface for an activity. In the example, the activity is a game of Checkers implemented using an open source Checkers solver library. An input image 601 of the activity may be provided to a rectifier. The rectifier may use quadrilateral rectification to produce a rectified image 603 and a homography matrix mapping pixels of the received image 601 to pixels of the rectified image 603. Configuration information may indicate use of color matching to examine 16 evenly spaced positions at the center of the 16 positions of the rectified image 603. Activity state information may be determined from the rectified image 603 based on relationships of average pixel color values of the 16 positions compared to four colors specified by the configuration information. The four colors may be black and white, for the colors of a surface of the game, and any two other colors associated with the checkers used to play the game. The activity state information may be provided to an activity solver library, the open source Checkers solver library, to obtain solution information. The solution information may be rendered on the rectified image, creating the updated rectified image 605. Additionally, the solution information may be rendered in a perspective of the received image, creating an augmented reality display 607 using an inverse of the homography matrix. The rendered elements of the augmented reality display 607 may be rendered multiple frames per second, in real-time. As shown in the example augmented reality display 607, elements such as an arrow showing a next move may be provided over the received image 601, for example.

In one example, a user may perform a turn and subsequently capture an image of the game producing the received image 601. The activity solver library may determine a modified game state of the game representing a computer's next move against the user. A user may then mimic the move indicated by the rendered elements in the augmented reality display 607. The user may repeat the process to continue playing Checkers against the computer. In another example, a first user playing against a second user may capture an image of the game at the first user's turn. The activity solver library may indicate a next move or advice for the first user.

Additional embodiments of generating augmented reality interfaces for activities are also contemplated. In one embodiment, the activity may be information rendered on a document. Solution information provided by an activity solver library may include information indicating explanation of the information rendered on the document. The information may be one or more equations, one or more questions, or other types of information requiring an explanation.

In another embodiment, a hand-held gaming device or mobile device may capture an image of an activity in order to determine a solution or advice for the activity. A sample of the activities, not intended to be limiting, may include Checkers, Connect-4, Go, Ludo, Risk, Sudoku, Crossword puzzles, among others. In another embodiment, an augmented reality interface may be created for activities performed with playing cards or dice. The surface of the activity may be a table or other surface on which the activity is performed. The surface of the activity need not be a game board or other particular surface on which the game is performed. A surface may be interpreted and expanded to include an area around recognized activity pieces, objects, or tokens of the activity. The surface may further include any surface upon which an activity can be performed, for example.

In another embodiment, an augmented reality interface may be created for activities of game shows or tournaments. For example, monitoring and updating of a game state in chess, Go, or poker tournaments may be possible. Rendering of possible next moves or commentator advice regarding the tournament or game show may be performed to create an augmented reality display for the activity.

In another embodiment, robots with cameras may be able to perform activities by capturing an image of the activity and extracting activity state information for the activity. The robots may be able to perform a next action associated with the activities based on the extracted activity state information. For example, a robot may be able to play a physical game of Checkers on a surface.

Figure 7:
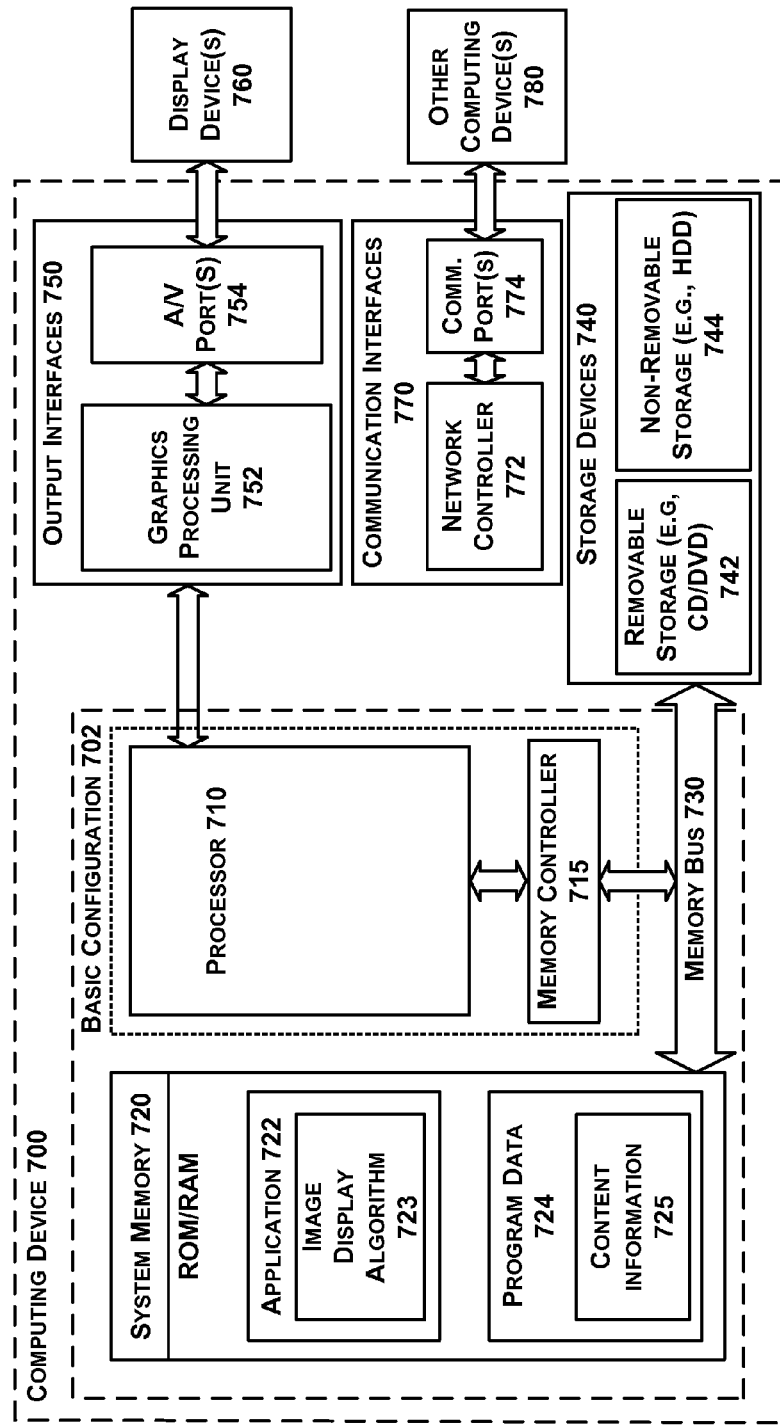
FIG. 7 is a functional block diagram illustrating an example computing device used in a computing system that is arranged in accordance with at least some embodiments described herein.

FIG. 7 is a functional block diagram illustrating an example computing device 700 used in a computing system that is arranged in accordance with at least some embodiments described herein. The computing device may be a personal computer, mobile device, cellular phone, touch-sensitive wristwatch, tablet computer, video game system, or global positioning system, and may be implemented to generate an augmented reality interface as described in FIGS. 1-6. In a very basic configuration 702, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 may include one or more applications 722, and program data 724. Application 722 may include an image display algorithm 723 that is arranged to provide inputs to the electronic circuits, in accordance with the present disclosure. Program data 724 may include content information 725 that could be directed to any number of types of data. In some example embodiments, application 722 can be arranged to operate with program data 724 on an operating system.

Computing device 700 can have additional features or functionality, and additional interfaces to facilitate communications between the basic configuration 702 and any devices and interfaces. For example, data storage devices 740 can be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 750 that may include a graphics processing unit 752, which can be configured to communicate to various external devices such as display devices 760 or speakers via one or more A/V ports or a communication interface 770. The communication interface 770 may include a network controller 772, which can be arranged to facilitate communications with one or more other computing devices 780 over a network communication via one or more communication ports 774. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

Figure 8:
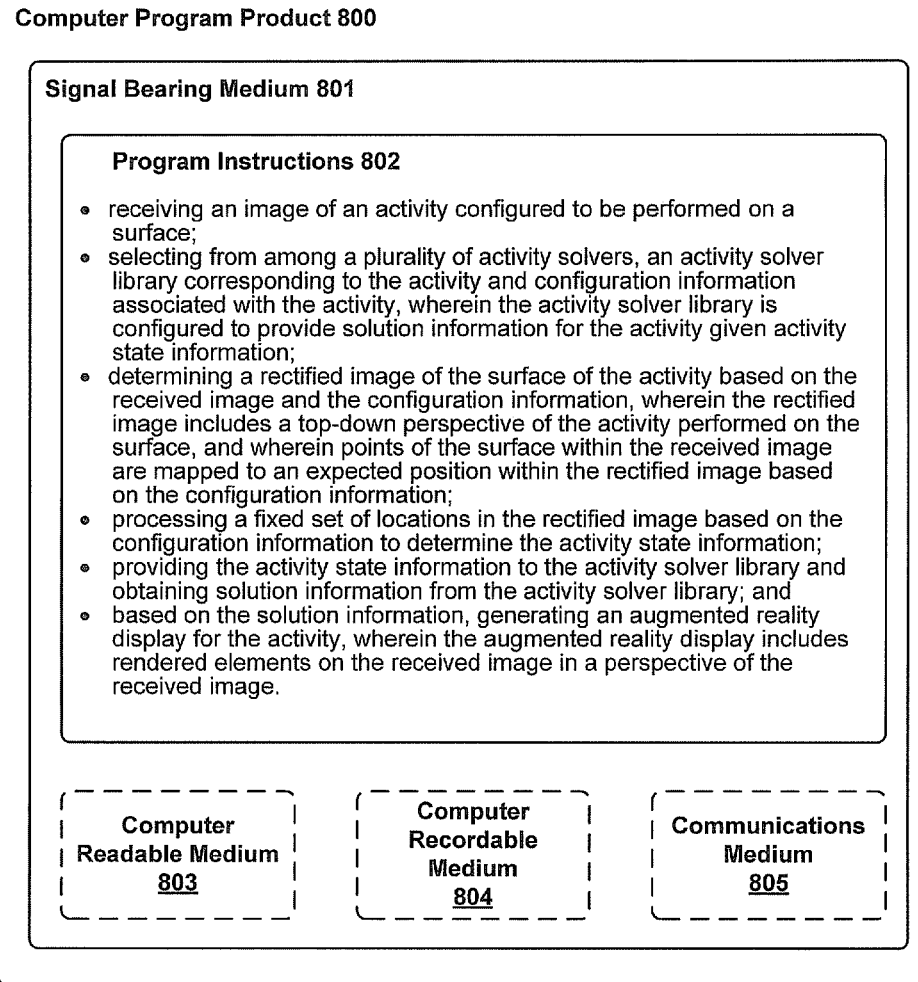
FIG. 8 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein. In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-7. Thus, for example, referring to the embodiments shown in FIG. 2, one or more features of blocks 201-211 may be undertaken by one or more instructions associated with the signal bearing medium 801.

In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
    obtaining an image of a game playing surface, and of one or more game pieces on the game playing surface;
    generating, by one or more computers and based on the image, a rectified representation of the game playing surface;
    determining, based on the image and from among multiple games of different types, a game of a particular type being played in the image;
    determining, by the one or more computers and based on a relative arrangement of the game pieces on the rectified representation of the game playing surface, a game play state of the game being played in the image;
    selecting, based on the image and from among a set of game solvers that each provides solutions for a game of a different type, a particular game solver that provides solutions for the game of the particular type being played in the image;
    providing data indicating the game play state to the particular game solver that provides solutions for the game being played in the image;
    in response to providing data indicating the game play state to the particular game solver, receiving a solution for the game being played in the image; and
    providing, for display, a representation of the solution for the game being played in the image.

2. The method of claim 1, wherein determining the game play state of the game being played in the image comprises:
    after determining the game being played in the image, identifying a surface associated with the game in the image;
    generating a rectified image based on the surface; and
    determining the game play state based on the rectified image.

3. The method of claim 2, wherein identifying a surface associated with the game in the image comprises:
    receiving configuration data associated with the game being played in the image; and
    identifying the surface associated with the game based on the configuration data.

4. The method of claim 2, wherein generating a rectified image of the surface comprises:
    identifying a first perspective associated with the surface in the image;
    determining a second perspective associated with the rectified image of the surface, wherein the first perspective is different from the second perspective; and
    generating the rectified image of the surface using the second perspective.

5. The method of claim 2, wherein identifying a surface associated with the game in the image comprises identifying the surface using quadrilateral rectification.

6. The method of claim 2, wherein determining the game play state based on the rectified image comprises:
    dividing the rectified image into a plurality of image regions;
    for each respective image region of the plurality of image regions, determining state data associated with the respective image region; and
    determining the game play state of the game being played in the image based on the state data associated with the plurality of image regions.

7. The method of claim 2, comprising:
    detecting a relative arrangement of features within the image based on one or more training images associated with the game; and
    determining a mapping between the image and the rectified image.

8. The method of claim 1, wherein determining the game play state of the game being played in the image comprises determining the game play state using optical character recognition.

9. The method of claim 1, wherein determining the game play state of the game being played in the image comprises matching a portion of the image with one or more training images associated with the game.

10. A non-transitory computer-readable medium storing software having stored thereon instructions, which, when executed by one or more computers, cause the one or more computers to perform operations of:
obtaining an image of a game playing surface, and of one or more game pieces on the game playing surface;
generating, by one or more computers and based on the image, a rectified representation of the game playing surface;
determining, based on the image and from among multiple games of different types, a game of a particular type being played in the image;
determining, by the one or more computers and based on a relative arrangement of the game pieces on the rectified representation of the game playing surface, a game play state of the game being played in the image;
selecting, based on the image and from among a set of game solvers that each provides solutions for a game of a different type, a particular game solver that provides solutions for the game of the particular type being played in the image;
providing data indicating the game play state to the particular game solver that provides solutions for the game being played in the image;
in response to providing data indicating the game play state to the particular game solver, receiving a solution for the game being played in the image; and
providing, for display, a representation of the solution for the game being played in the image.

11. The computer-readable medium of claim 10, wherein determining the game play state of the game being played in the image comprises:
after determining the game being played in the image, identifying a surface associated with the game in the image;
generating a rectified image based on the surface; and
determining the game play state based on the rectified image.

12. The computer-readable medium of claim 11, wherein identifying a surface associated with the game in the image comprises:
receiving configuration data associated with the game being played in the image; and
identifying the surface associated with the game based on the configuration data.

13. The computer-readable medium of claim 11, wherein generating a rectified image of the surface comprises:
identifying a first perspective associated with the surface in the image;
determining a second perspective associated with the rectified image of the surface, wherein the first perspective is different from the second perspective; and
generating the rectified image of the surface using the second perspective.

14. The computer-readable medium of claim 11, wherein determining the game play state based on the rectified image comprises:
dividing the rectified image into a plurality of image regions;
for each respective image region of the plurality of image regions, determining state data associated with the respective image region; and
determining the game play state of the game being played in the image based on the state data associated with the plurality of image regions.

15. The computer-readable medium of claim 11, comprising:
detecting a relative arrangement of features within the image based on one or more training images associated with the game; and
determining a mapping between the image and the rectified image.

16. A system comprising:
one or more processors and one or more computer storage media storing instructions that are operable, when executed by the one or more processors, to cause the one or more processors to perform operations comprising:
obtaining an image of a game playing surface, and of one or more game pieces on the game playing surface;
generating, by one or more computers and based on the image, a rectified representation of the game playing surface;
determining, based on the image and from among multiple games of different types, a game of a particular type being played in the image;
determining, by the one or more computers and based on a relative arrangement of the game pieces on the rectified representation of the game playing surface, a game play state of the game being played in the image;
selecting, based on the image and from among a set of game solvers that each provides solutions for a game of a different type, a particular game solver that provides solutions for the game of the particular type being played in the image;
providing data indicating the game play state to the particular game solver that provides solutions for the game being played in the image;
in response to providing data indicating the game play state to the particular game solver, receiving a solution for the game being played in the image; and
providing, for display, a representation of the solution for the game being played in the image.

17. The system of claim 16, wherein determining the game play state of the game being played in the image comprises:
after determining the game being played in the image, identifying a surface associated with the game in the image;
generating a rectified image based on the surface; and
determining the game play state based on the rectified image.

18. The system of claim 17, wherein identifying a surface associated with the game in the image comprises:
receiving configuration data associated with the game being played in the image; and
identifying the surface associated with the game based on the configuration data.

19. The system of claim 17, wherein generating a rectified image of the surface comprises:
identifying a first perspective associated with the surface in the image;
determining a second perspective associated with the rectified image of the surface, wherein the first perspective is different from the second perspective; and
generating the rectified image of the surface using the second perspective.

20. The system of claim 17, wherein determining the game play state based on the rectified image comprises:
dividing the rectified image into a plurality of image regions;

for each respective image region of the plurality of image regions, determining state data associated with the respective image region; and determining the game play state of the game being played in the image based on the state data associated with the plurality of image regions.

\* \* \* \* \*